(12) United States Patent
Liang Liang

(10) Patent No.: US 11,283,899 B2
(45) Date of Patent: Mar. 22, 2022

(54) METHOD AND APPARATUS FOR DEPLOYING COMPUTER NETWORKS

(71) Applicant: LENOVO (BEIJING) LTD., Beijing (CN)

(72) Inventor: Ma Liang Liang, Beijing (CN)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 891 days.

(21) Appl. No.: 15/373,266

(22) Filed: Dec. 8, 2016

(65) Prior Publication Data

US 2018/0167489 A1 Jun. 14, 2018

(51) Int. Cl.
| | |
|---|---|
| *G06F 15/173* | (2006.01) |
| *H04L 67/00* | (2022.01) |
| *H04L 61/5014* | (2022.01) |
| *H04L 12/18* | (2006.01) |
| *H04L 67/01* | (2022.01) |

(52) U.S. Cl.
CPC .............. *H04L 67/34* (2013.01); *H04L 12/18* (2013.01); *H04L 12/1895* (2013.01); *H04L 61/2015* (2013.01); *H04L 67/42* (2013.01)

(58) Field of Classification Search
CPC .............. H04L 41/0806; H04L 41/0846; H04L 41/0886; H04L 41/12; H04L 67/34
See application file for complete search history.

(56) References Cited

U.S. PATENT DOCUMENTS

| | | | |
|---|---|---|---|
| 2004/0133689 A1* | 7/2004 | Vasisht | H04L 41/0803 709/228 |
| 2010/0115077 A1* | 5/2010 | Tameshige | H04L 41/06 709/223 |
| 2011/0055364 A1* | 3/2011 | Heim | H04L 41/0806 709/223 |

FOREIGN PATENT DOCUMENTS

| | | |
|---|---|---|
| CN | 101500346 A | 8/2009 |
| CN | 101656763 A | 2/2010 |

\* cited by examiner

*Primary Examiner* — Cheikh T Ndiaye
(74) *Attorney, Agent, or Firm* — Antony P. Ng; Russell Ng PLLC

(57) ABSTRACT

A method for deploying computer networks in a network environment is disclosed. Initially, a broadcast message is transmitted by a network device within a server to a network in order to investigate the availability of the network. A determination is made as to whether or not a response message responding to the broadcast message has been received by the network device within the server. If a response message has been received by the network device, it means the network is available and the network device can be configured to connect with the network. However, if no response message has been received by the network device, it means the network is not available and the network device can be configured as a server node of the network.

20 Claims, 4 Drawing Sheets

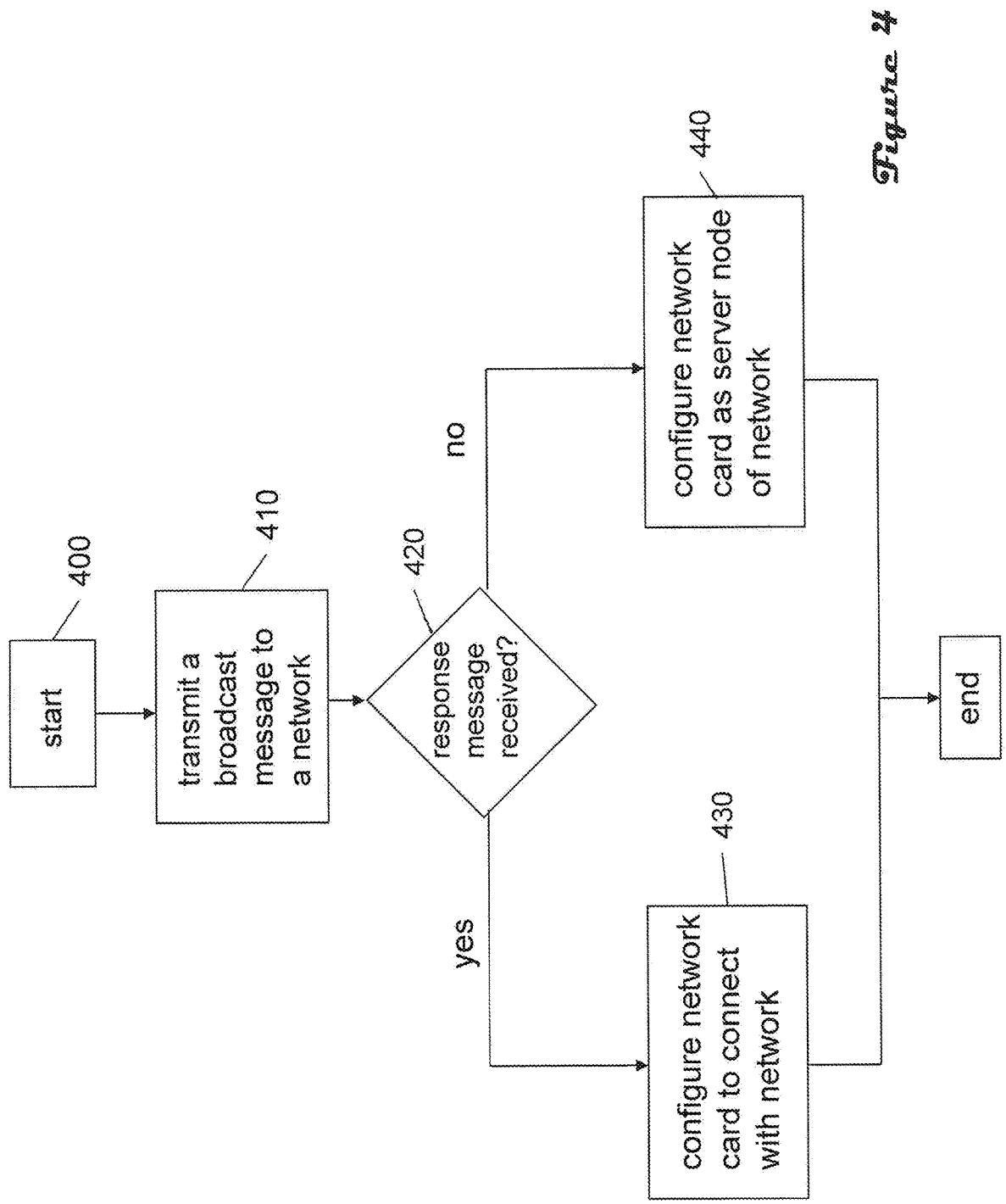

METHOD AND APPARATUS FOR DEPLOYING COMPUTER NETWORKS

PRIORITY CLAIM

The present application claims benefit of priority under 35 U.S.C. §§ 120, 365 to the previously filed Chinese Patent Application No. 201510897654.3 with a priority date of Dec. 8, 2015, which is incorporated by reference herein.

TECHNICAL FIELD

The present invention relates to computer networks in general, and in particular to a method and apparatus for automatically configuring new servers in a data center to deploy computer networks within a network environment.

BACKGROUND

A network environment may include one or more computer networks, and each computer network may have multiple servers. Servers from different manufacturers may have different hardware from each other as well as different operating systems installed. In addition, each server within the computer network typically has multiple network cards. Thus, it is quite difficult to automate the initial build process of a computer network because many processes cannot be automatically performed at an infrastructure implementation stage.

Currently, many steps of the computer network deployment method have to be done manually in order to ensure correct configurations of the computer network. Needless to say, performing, network deployment steps manually is the most time-consuming part of the network deployment process and it is very prone to errors.

Consequently, it would be desirable to provide an improved method for deploying multiple computer networks within a network environment.

SUMMARY

In accordance with one embodiment of the present disclosure, a broadcast message is transmitted by a network device within a server to a network in order to investigate the availability of the network. A determination is made as to whether or not a response message responding to the broadcast message has been received by the network device within the server. If a response message has been received by the network device, it means the network is available, and the network device can be configured to connect with the network. However, if no response message has been received by the network device, it means the network is not available, and the network device can be configured as a server node of the network.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a high-level flow diagram of a method for configuring a server to deploy a computer network, in accordance with one embodiment of the present disclosure.

DETAILED DESCRIPTION

Figure 1:
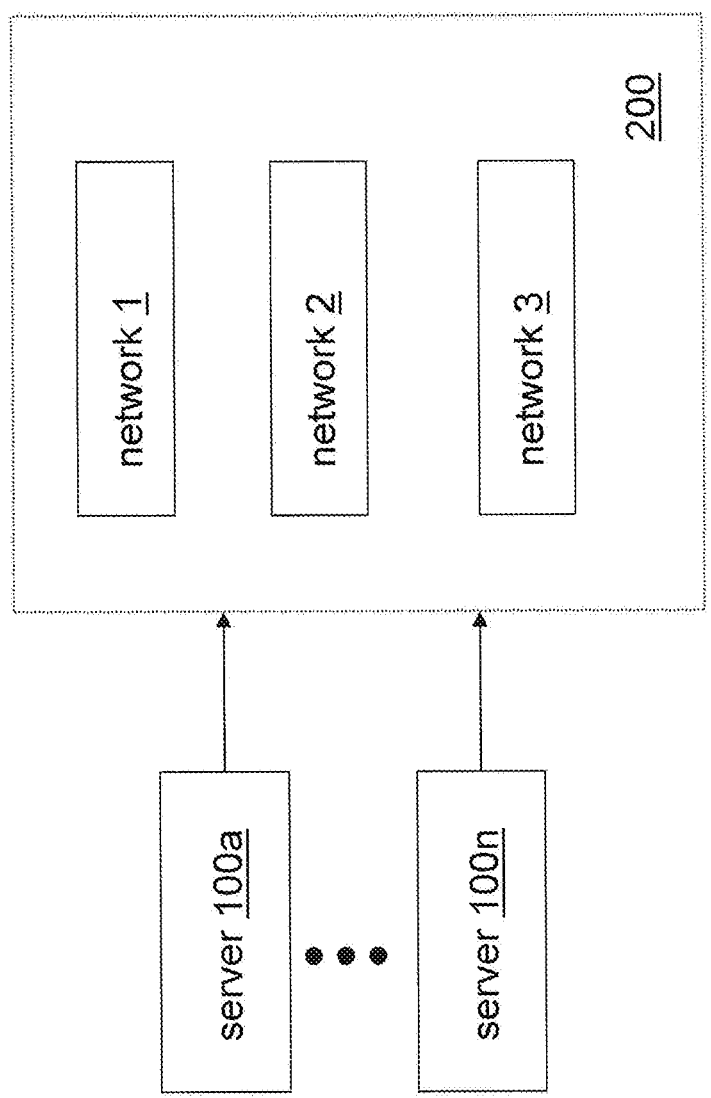
FIG. 1 is a block diagram of a group of new servers that can be automatically configured to deploy computer networks within a network environment.

Referring now to the drawings and in particular to FIG. 1, there is depicted a block diagram of a group of new servers that can be automatically configured to deploy computer networks within a network environment. As shown, within a network environment 200, there can be one or more computer networks, such as network 1, network 2 and network 3. New servers 100a-100n located in a data center, for example, can be automatically configured to deploy networks within network environment 200. Although each of servers 100a-100n may have different hardware and software installed, the following is a description of server 100a, as an example, in which the method of the present disclosure can be incorporated.

Figure 2:
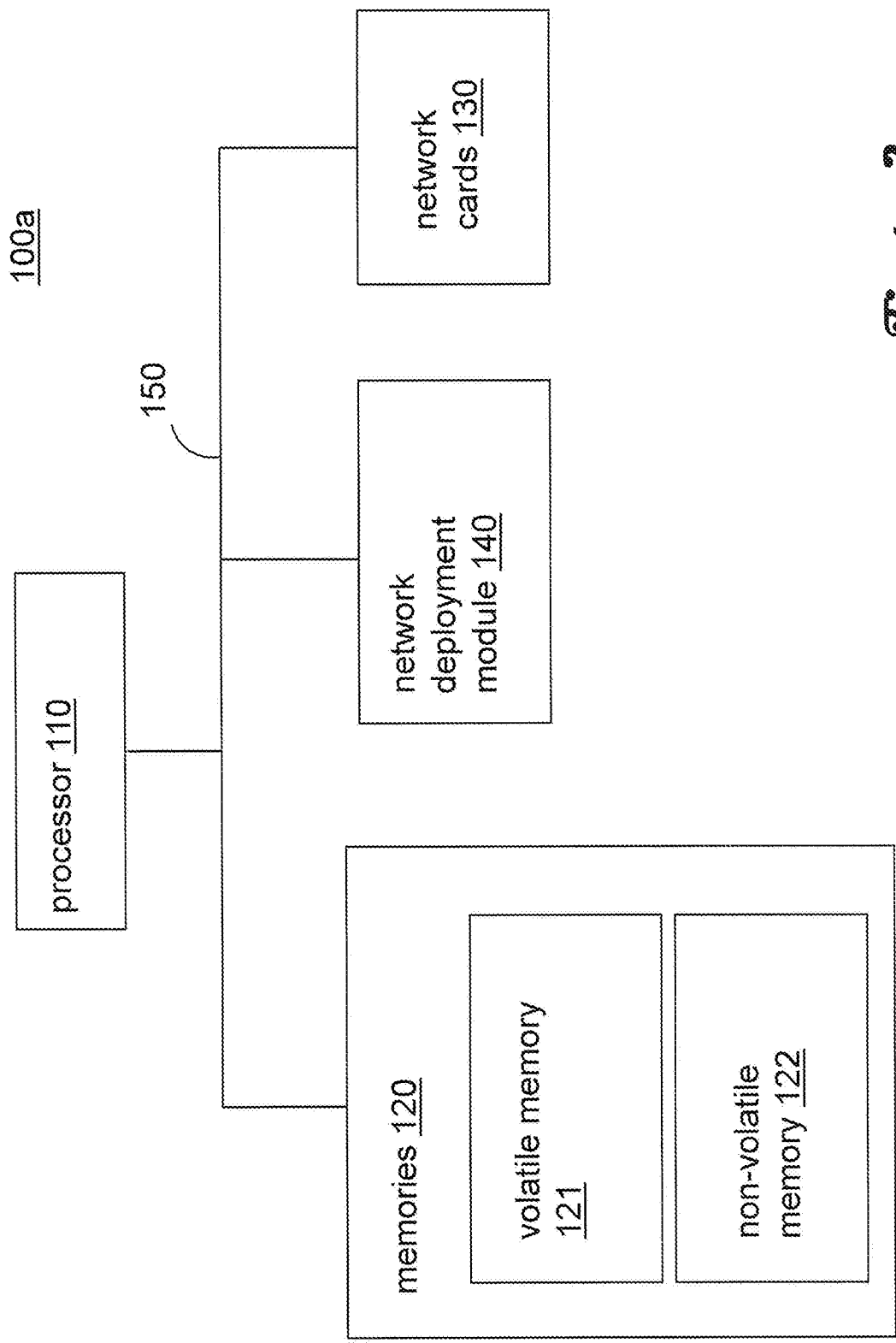
FIG. 2 is a block diagram of a server within a computer network, in accordance with one embodiment of the present disclosure.

With reference now to FIG. 2, there is depicted is a block diagram of a server that can be configured to deploy a computer network, in accordance with one embodiment of the present disclosure. As shown, server 100a includes a processor 110, memories 120, network cards 130 and a network deployment module 140. Processor 110 can be coupled to memories 120, network cards 130 and network deployment module 140 via a bus 150 and/or other forms of connecting mechanisms (not shown).

Processor 110 can be a central processing unit (CPU) or other forms of processing unit with data processing capability and/or instruction execution capability, which is configured to control various components within server 100a to perform the desired functions accordingly.

Memories 120 include various forms of computer-readable storage media, such as a volatile memory 121 and a non-volatile memory 122, for storing one or more computer program products. Volatile memory 121 may include, for example, a random access memory (RAM), a cache memory and the like. Non-volatile memory 122 may include, for example, a read-only memory (ROM), a hard disk, a flash memory and the like. One or more computer program instructions can be stored within memories 120, and processor 110 can execute the program instructions to achieve the function of the method of the present disclosure and any other desired functions.

Network cards 130 can be utilized by server 100a to communicate with other servers within the same network or other networks. Network deployment module 140 performs the necessary functions to deploy a computer network.

It should be noted that the components and structures of server 100a in FIG. 1 are illustrative only and not restrictive, and server 100a may include other components and structures as needed.

Figure 3:
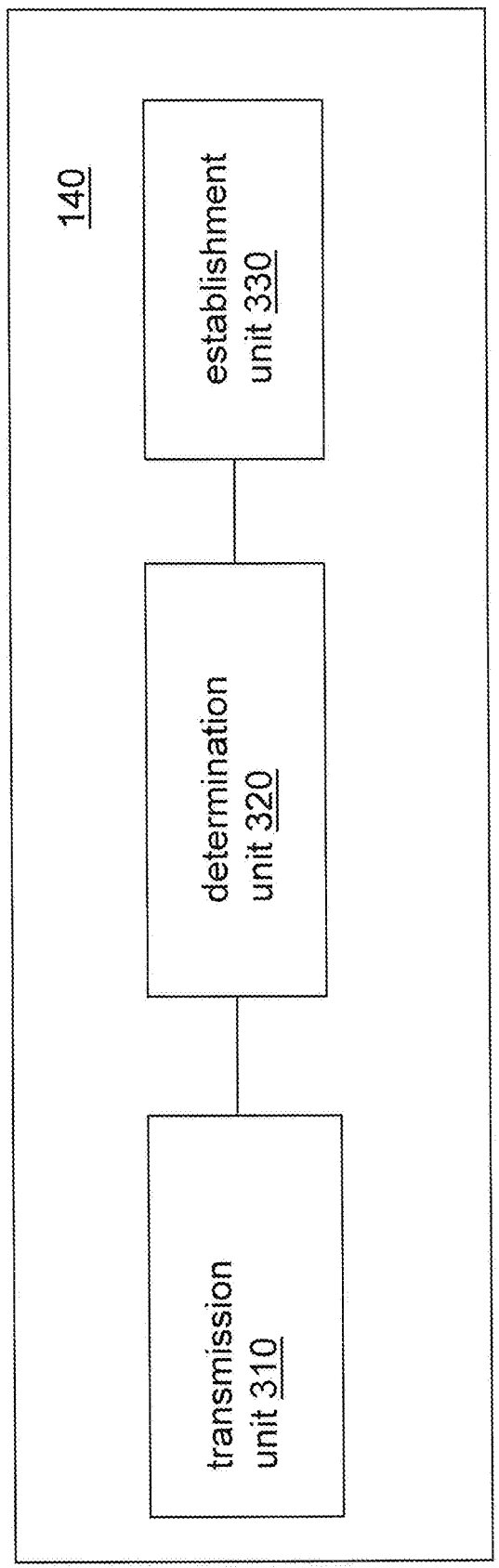
FIG. 3 is a block diagram of a network deployment module within the server of FIG. 1, in accordance with one embodiment of the present disclosure.

Referring now to FIG. 3, there is depicted a detailed block diagram of network deployment module 140 from FIG. 1, in accordance with one embodiment of the present disclosure. As shown, network deployment module 140 includes a transmission unit 310, a determination unit 320 and an establishment unit 330. Transmission unit 210 may communicate with various network cards within other servers of the same computer network and other computer networks by, for example, obtaining or leasing a temporary IP address in order to transmit a broadcast message (such as a ping message) to each of the various network cards within other servers.

Transmission unit 310 may compile the corresponding IP addresses of all the network cards within all the servers. The order of transmitting broadcast messages from transmission unit 310 can be predetermined and prioritized. For example, higher status network(s) within the network environment will be given priority accordingly.

Transmission unit 310 can sequentially transmit broadcast messages to the various network cards in order to detect the status of the corresponding computer network within the network environment, and to determine whether or not server 100*a* can serve as a server node for connecting with one or more other computer networks within the network environment such that a computer network can be deployed automatically and reliably. Determination unit 320 determines whether or not a response message responsive to a broadcast message has been received. If no response message corresponding to a particular broadcast message has been received, establishment unit 230 will then provide a server node to connect the sending server into the one or more computer networks of the network environment. Establishment unit 330 may be implemented as a Dynamic Host Configuration Protocol (DHCP) server, for example. Optionally, establishment unit 330 may include a sequence acquisition unit to acquire a preset sequence of communicating sequentially with corresponding network cards of other servers within the computer network.

With reference now to FIG. 4, there is depicted high-level flow diagram of a method for configuring a server to deploy a computer network, in accordance with one embodiment of the present disclosure, Staring at block 400, a network device, such as network card 130 from FIG. 2, within a new server, such as server 100*a* from FIG. 2, is configured to detect the status of a computer network within a network environment by sending a broadcast message to another server within the computer network, as shown in block 410.

Next, the server determines whether or not a response message responsive to the broadcast message has been received from the computer network, as depicted in block 420. If a response message has been received from the computer network, the server can conclude that the computer network is available, and the network device can be configured device to connect with that computer network, as shown in block 430. For example, an IP address of the network device can be configured based on the received response message.

However, if no response message has been received from the computer network, the server can conclude that the computer network is not available, and the network device can be configured as a server node of that computer network, as depicted so in block 440. For example, the network device can be configured as a server node of the network by initiating a client-server protocol, such as a Dynamic Host Configuration Protocol (DHCP).

Using new servers 100*a*, 100*b* and 100*c* in FIG. 1 as an example, and if each of servers 100*a*-100*c* includes network cards Ax, Ay and Az, and the network environment includes network 1, network 2 and network 3, then the following steps will be performed to check the status of various computer networks:

(1) Network card Ax sends a broadcast message to network 1. If no response is received, then go to (2). If a response is received, then obtain network card Ax's IP address, and go to (4).

(2) Network card Ax sends a broadcast message to network 2. If no response is received, then go to (3). If a response is received, then obtain network card Ax's IP address, and go to (4).

(3) Network card Ax sends a broadcast message to network 3. If no response is received, then go to (4). If a response is received, then obtain network card Ax's IP address, and go to (4).

(4) Network card Ay sends a broadcast message to network 1. If no response is received, then go to (5). If a response is received, then obtain network card Ay's IP address, and go to (7).

(5) Network card Ay sends a broadcast message to network 2. If no response is received, then go to (6). If a response is received, then obtain network card Ay's IP address, and go to (7).

(6) Network Ay sends a broadcast message to network 3. If no response is received, then go to (7). If a response is received, then obtain network card Ay's IP address, and go to (7).

(7) Network card Az sends a broadcast message to network 1. If no response is received, then go to (8). If a response is received, then obtain network card Az's IP address, and go to (10);

(8) Network card Az sends a broadcast message to network 2. If no response is received, then go to (9). If a response is received, then obtain network card Az's IP address, and go to (10);

(9) Network card Az sends a broadcast message to network 3. If no response is received, then go to (10). If a response is received, then obtain network card Az's IP address, and go to (10);

(10) If no network, then set IP address of network card(s) according to network design.

(11) Clear network table; server configuration is completed.

Each of servers 100*b* and Me then performs the above-mentioned steps (1)-(11) to complete the server configuration process.

The server communicates with each of the network cards within each of the is other servers in a sequential manner by, for example, obtaining or leasing a temporary IP address in order to transmit a broadcast message to each of the network cards. The order of receiving broadcast messages by the servers may be predetermined and prioritized. For example, the higher priority computer networks will be receiving broadcast messages before the lower priority computer networks.

As has been described, the present disclosure provides a method and apparatus for configuring servers to deploy computer networks in a network environment. By configuring a server to deploy a computer network, network deployment can be achieved automatically without being constrained by various conditions such as the number of networks, the number of network cards, the type of operating systems, the layout of the physical servers, etc. As a result, the efficiency of the process of deploying computer networks is greatly enhanced, which is particularly advantageous in the scenario of batch deployment of large platforms.

It is also important to note that although the present invention has been described in the context of a method and apparatus, those skilled in the art will appreciate that the method of the present invention is capable of being distributed as a computer program product via a computer readable medium such as a compact disc.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   transmitting a broadcast message by a network device within a server to a network in order to investigate the availability of said network;
   determining whether or not a response message responding to said broadcast message has been received by said network device within said server;
   in a determination that a response message has been received by said network device, concluding that said network is available and configuring said network device to connect with said network; and
   in a determination that no response message has been received by said network device, concluding that said network is not available and configuring said network device as a server node of said network.

2. The method of claim 1, wherein said transmitting further includes transmitting said broadcast message to a default IP address corresponding to said network.

3. The method of claim 1, wherein said configuring said network device to connect with said network further includes configuring an IP address of said network device based on said received response message.

4. The method of claim 1, wherein said configuring said network device as a server node of said network further includes initiating a client-server protocol.

5. The method of claim 4, wherein said client-server protocol is a Dynamic Host Configuration Protocol (DHCP).

6. The method of claim 1, wherein said transmitting further includes transmitting a plurality of broadcast messages by said network device to investigate the availability of a plurality of respective networks.

7. The method of claim 6, wherein said plurality of broadcast messages are transmitted to respective default IP addresses corresponding to said respective networks.

8. The method of claim 6, wherein said plurality of networks are accorded with priority settings, and said plurality of broadcast messages are transmitted via said network device according to said priority settings.

9. A server comprising:
   a plurality of memories;
   a network device coupled to said plurality of memories; and
   a processor coupled to said network device, wherein said processor
   directs said network device to transmit a broadcast message to a network in order to investigate the availability of said network;
   determines whether or not a response message responding to said broadcast message has been received by said network device;
   concludes that said network is available and configures said network device to connect with said network, in a determination that a response message responding to said broadcast message has been received by said network device; and
   concludes that said network is not available and configures said network device as a server node of said network, in a determination that no response message responding to said broadcast message has been received by said network device.

10. The server of claim 9, wherein said broadcast message is transmitted to a default IP address corresponding to said network.

11. The server of claim 9, wherein said network device is connected with said network by configuring r IP address of said network device based on said response message as detected.

12. The server of claim 9, wherein said network device is configured as the server node of said network by initiating a client-server protocol.

13. The server of claim 12, wherein said client-server protocol is a Dynamic Rost Configuration Protocol (DHCP).

14. The server of claim 9, wherein a plurality of broadcast messages is transmitted by said network device to investigate the availability of a plurality of respective networks.

15. The server of claim 14, wherein said plurality of broadcast messages are transmitted to respective default IP addresses corresponding to said respective networks.

16. The server of claim 15, wherein said plurality of networks are accorded with priority settings, and said plurality of broadcast messages are transmitted via said network device in accordance with said priority settings.

17. A storage device comprising;
   program code stored within said storage device for controlling a processor to
   direct a network device within a server to transmit a broadcast message to a network in order to investigate the availability of said network;
   determine whether or not a response message responding to said broadcast message has been received by said network device within said server;
   in a determination that a response message respondirw to said broadcast message has been received by said network device, conclude that said network is available and configure said network device to connect with said network; and
   in a determination that no response message responding to said broadcast message has been received by said network device, conclude that said network is not available and configure said network device as a server node of said network.

18. The storage device of claim 17, wherein said program code stored within said storage device for controlling, said processor to direct further includes program code for controlling said processor to direct said network device to transmit said broadcast message to a default IP address corresponding to said network.

19. The storage device of claim 17, wherein said program code stored within said storage device for controlling said processor to configure said network device to connect with said network further includes said program code for controlling said processor to configure an IP address of said network device based on said received response message.

20. The storage device computer of claim 17, wherein said program code stored within said storage device for controlling said processor to configure said network device as a server node of said network further includes program code for controlling said processor to initiate a client-server protocol.

* * * * *